Feb. 19, 1952  V. B. ROYCE  2,586,439
OPHTHALMIC MOUNTING
Filed Dec. 29, 1948

INVENTOR.
VIRGINIA B. ROYCE
BY *Louis L. Gagnon*
ATTORNEY

Patented Feb. 19, 1952

2,586,439

UNITED STATES PATENT OFFICE 2,586,439

OPHTHALMIC MOUNTING

Virginia B. Royce, Chicago, Ill., assignor to American Optical Company, Southbridge, Mass., a voluntary association of Massachusetts Application December 29, 1948, Serial No. 67,789

4 Claims. (Cl. 88—41)

This invention relates to ophthalmic mountings and more particularly to an ophthalmic mounting wherein the lenses may be quickly and easily positioned in assembled relation with the lens supporting structure or removed therefrom, whereby a plurality of lenses possessing different optical characteristics may be used with a single lens supporting structure.

One of the principal objects of the invention is to provide an ophthalmic mounting embodying two separate units which may be quickly and easily assembled with each other to complete the mounting, one of said units comprising a main supporting structure embodying spaced lens rims connected by a bridge member and having temple supporting means on the temporal sides thereof to which temples may be connected, each of said lens supporting rims having an inner groove extending throughout the nasal side, throughout the lower portion thereof and throughout the temporal side and having an entrant slot in the upper portion thereof communicating with the inner groove, and the other of said units comprising a pair of lenses connected to a bar-like member in proper spaced relation with each other whereby the lenses may be inserted through the slots in the upper portions of the respective rims and moved to a position resting within the grooves, with the bar-like member assuming a position in overlying relation with the upper slotted portions of the rims and thereby providing a mounting with which a plurality of units of the latter type and possessing different optical characteristics may be interchangeably used.

Another object is to provide an ophthalmic mounting of the above character formed of any desirable materials commonly used in the ophthalmic art and which requires no separate and removable attachment means for retaining the units, such as described above, in assembled relation with each other.

Another object is to provide an ophthalmic mounting of the above character wherein the upper slotted portions of the rims will function cooperatively with the lenses for interchangeably retaining the two units in assembled relation with each other.

Other objects and advantages of the invention will become apparent from the following description taken in conjunction with the accompanying drawings and it will be apparent that many changes in the details of construction and arrangement of parts may be made without departing from the spirit of the invention as expressed in the accompanying claims. I, therefore, do not wish to be limited to the exact details of construction and arrangement of parts shown and described as the preferred form only has been given by way of illustration.

Referring to the drawings.

Figure 1:
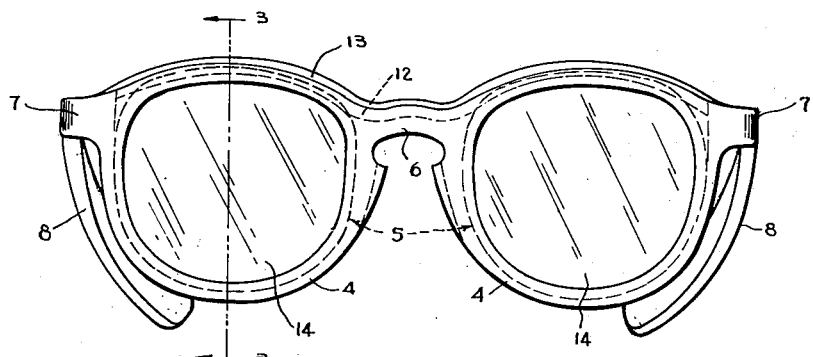
Fig. 1 is a front elevational view of an ophthalmic mounting embodying the invention.
Figure 2:
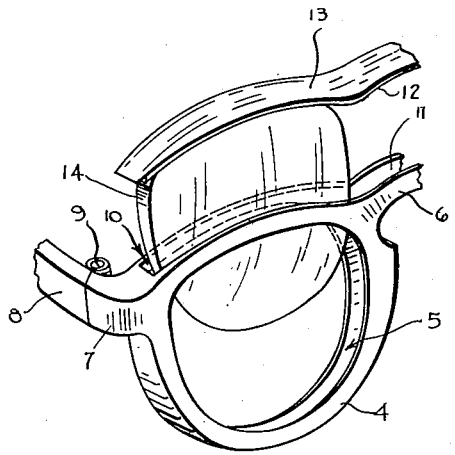
Fig. 2 is a fragmentary perspective view showing the arrangement of parts and how the two separate major units of the ophthalmic mounting are positioned in assembled relation with each other.

Individuals who require the use of ophthalmic mountings, in many instances, find that they require a different ophthalmic correction for reading vision than they require for distant vision. Lenses of the type known as multifocal lenses have been designed to have incorporated therein different fields or portions possessing the different prescriptive requirements of the particular user. Many individuals, however, have experienced considerable difficulty in attempting to use an ophthalmic mounting embodying such multifocal lenses, with the result that they had to obtain an ophthalmic mounting having single vision lenses therein of the power required for the correction of their distant vision and an additional mounting having lenses therein of the power required for near vision correction. This, therefore, necessitated the use of two complete mountings.

Such individuals further found it desirable, particularly when their eyes were exposed to high intensity light or glare, to wear lenses having different desirable absorptive characteristics. This required additional complete mountings.

The present invention is directed to overcoming the above difficulties through the provision of an ophthalmic mounting having, as one major unit thereof, a lens supporting structure, and as another unit, a lens assembly which may be quickly and easily assembled with the supporting structure. A plurality of separate units comprising lenses having different optical or absorptive characteristics, as set forth above, are provided for interchangeable use with the main supporting structure.

With the present invention all that is required is to withdraw one lens unit from the lens supporting structure and to replace said unit with another lens unit possessing different desired characteristics.

Referring more particularly to the drawing, wherein like characters of reference designate like parts throughout the several views, the device embodying the invention comprises, as one major unit, a pair of lens rims 4 having an inner channel or groove 5 extending from the nasal sides of the rims throughout the lower portions thereof and throughout the temporal sides of the rims.

The rims 4 are connected by a central bridge portion 6 and have temple supporting lugs 7 on the temporal sides thereof, to which suitable temples 8 are pivotally connected by hinge means or the like 9.

Figure 4:
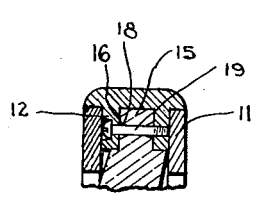
Fig. 4 is an enlarged fragmentary sectional view of a modification.

Each of the lens rims, throughout the major length of the upper portions thereof, are provided with a slot 10 communicating with the inner channels or grooves 5. The bridge portion 6 is provided with a longitudinal groove 11 in the upper portion thereof, which communicates with the slots 10 formed in the respective upper portions of the rims. The spaced longitudinal side walls of the slots 10 and the grooves 11 are of substantially equal width and are adapted to receive the rib 12 formed on the lower side of a bar member 13 having a pair of spaced lenses 14 secured thereto. The respective lenses are provided with upper edge portions 15 which fit within grooves 16 formed in the rib 12 and may be secured therein by mechanical means, such as shown in Fig. 4, or by suitable adhesive 17. The portion 15 is preferably formed to a width slightly less than the thickness of the lens in accordance with the width of the groove 16.

It is stated that mechanical means may be employed for securing the portions 15 of the lenses inwardly of the groove 16. This may be accomplished by forming the portion 15 of sufficient length to permit spaced openings 18 to be formed therein and through which conventional connection screws or the like 19 may be extended, with said rib 12 being provided with spaced openings in alignment with the spaced openings 18 in the portion 15 and through which the screws 19 or the like may be extended in a conventional manner, see Fig. 4.

Figure 3:
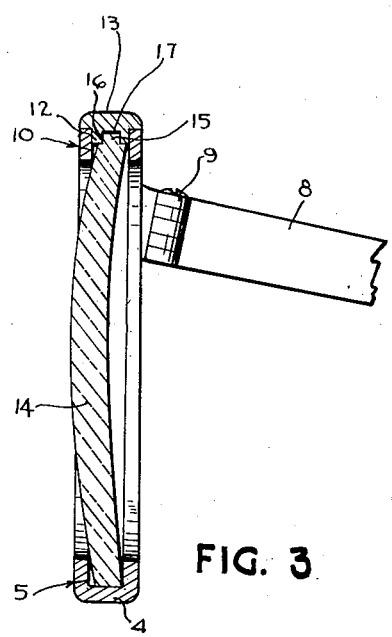
Fig. 3 is an enlarged fragmentary sectional view taken on line 3—3 of Fig. 1 and looking in the direction indicated by the arrows.

The bar-like member 13 is of a width substantially equal to the overall thickness of the upper portions of the rims and bridge member 6 and is adapted to be shaped to the upper contour shape of the rims and bridge so as to provide cap-like means overlying said upper portions of the rim and bridge with the rib 12 extending within the respective slots and grooves in the rims and bridge, as shown best in Fig. 3.

The bar member 13 and the attached lenses 14 are therefor formed as a separate unit which may be quickly and easily positioned in assembled relation with the main supporting structure and which may be quickly and easily removed from said structure and, in accordance with the present invention, a plurality of units embodying lenses having different optical and absorptive characteristics are formed to be interchangeably positioned in assembled relation with the main supporting structure.

It is to be understood that the rib 12 on the under side of the bar-like member 13 can be formed as a pair of separate spaced ribs adapted to be inserted within the slots 10 rather than as a single continuous rib. This will permit the omission of the slot 11 in the bridge member 6, thus adding to the strength of the structure.

It is particularly pointed out that the lenses are usually formed to a meniscus shape and, due to this shape, when being inserted through the slots 10 require that the spaced walls of the slots expand relative to each other to afford sufficient clearance for the insertion of the lenses. The said walls, however, are adapted to return to their initial set relation with each other when the lenses are in full assembled relation with the supporting structure. In order to bring about this result suitable material of the known plastic or artificial resinous types as well as metals possessing the proper resilient characters are used.

For example, resins of the cellulose acetate and cellulose nitrate type may be used and metals having proper resilient characteristics may be used such as stainless steel, gold, aluminum, chromium, silver or other known alloys.

Due to the fact that the spaced walls of the upper portions having the slots 10 therein return to their initial set position after the lenses 14 are in position of use within the lens rims 4 and to the resilient characteristics of said spaced portions they will function as means for yieldingly retaining the lens units in assembled relation with the main supporting structure. This function results from the requirement of said spaced portions to move outwardly with respect to each other in order to permit the lenses to be withdrawn from the slots 10.

Although one design of ophthalmic mounting has been shown and described it is to be understood that many different designs embodying different configurations and relations of parts may be made in accordance with the invention.

From the foregoing description it will be seen that simple, efficient and economical means have been provided for accomplishing all of the objects and advantages of the invention.

Having described my invention, I claim:

1. An ophthalmic mounting for interchangeably supporting lenses, said mounting comprising a pair of lens rims, an integral bridge member connecting said lens rims, and temple connection means on the temporal sides of said rims, the upper portion of said rims and integral bridge member being formed to a given controlled contour shape, and each of said rims having an inner lens receiving groove extending throughout the sides and lower portions thereof, the upper portions of said rims having a longitudinal slot communicating with said grooves and of a length substantially equal to the major width of the lens to be positioned within the groove of the rim whereby the lenses to be supported by said mounting may be positioned within the grooves of the rims by insertion thereof through the slots, and a bar-like member of a length sufficient to straddle the distance between the outer extremities of the slots and having a lower surface portion extending throughout the length thereof shaped substantially to the contour shape of the upper portions of the rims and the integral bridge member and to fit in intimate relation therewith when the lenses are properly positioned within the lens receiving grooves, said bar-like member having portions on the under side thereof shaped to receive connection means for attaching and retaining the lenses in proper spaced relation on said member for simultaneously positioning said lenses in the lens receiving grooves, whereby bar-like members and lenses having different characteristics may be formed as units for interchangeable use with said mounting.

2. An ophthalmic mounting for interchangeably supporting lenses, said mounting comprising a pair of lens rims, an integral bridge member connecting said lens rims, and temple connection means on the temporal sides of said rims, the upper portion of said rims and integral bridge member being formed to a given controlled contour shape, and each of said rims having an inner lens receiving groove extending throughout the sides and lower portions thereof, the upper portion of said mounting being channelled along the top of the rims and bridge from adjacent the temple connection means on opposed sides thereof, and the channelled portions of the rims communicating with the inner lens receiving groove therein to provide a pair of slots on opposed sides of the bridge of a length substantially equal to the major width of the lens to be positioned within the groove of the rim whereby the lenses to be supported by said mounting may be positioned within the grooves of the rims by insertion thereof through the slots, and a bar-like member of a length sufficient to straddle the distance between the outer extremities of the channelled top portion of the mounting, said bar-like member having a portion on its under side shaped substantially to the contour shape of the upper portions of the rims and the integral bridge member and to fit within said channelled portion of the rims and bridge when the lenses are properly positioned within the lens receiving grooves, said portions of the bar-like member fitting with the channelled portion of the rims having connection means for attaching and retaining lenses in proper spaced relation on said member for simultaneously positioning said lenses in the lens receiving grooves, whereby bar-like members and lenses having different characteristics may be formed as units for interchangeable use with said mounting.

3. An ophthalmic mounting for interchangeably supporting lenses, said mounting comprising a pair of lens rims, an integral bridge member connecting said lens rims, and temple connection means on the temporal sides of said rims, the upper portion of said rims and integral bridge member being formed to a given controlled contour shape, each of said rims having an inner lens receiving groove extending throughout the sides and lower portions thereof, and the upper portion of said mounting being channelled along the top of the rims and bridge from adjacent the temple connection means on opposed sides thereof, the channelled top of the rims forming a slot communicating with the lens receiving grooves therein and of a length substantially equal to the major width of the lens to be positioned within the groove of the rim whereby the lenses to be supported by said mounting may be positioned within the grooves of the rims by insertion thereof through the slots, and a bar-like member of a length sufficient to straddle the distance between the outer extremities of the slots, said bar-like member having a rib-like part on its under side seated in said channelled part of the rims and bridge with the under surface portions of the bar-like member on opposed sides of said rib-like part being shaped substantially to the contour shape of the upper portions of the rims and the integral bridge member to fit in intimate relation therewith when the lenses are properly positioned within the lens receiving grooves, said rib-like part fitting within the channelled top of the rims being shaped to receive connection means for attaching and retaining the lenses in proper spaced relation on said member for simultaneously positioning said lenses in the lens receiving grooves, whereby bar-like members and lenses having different characteristics may be formed as units for interchangeable use with said mounting.

4. A lens supporting structure for interchangeably supporting lenses in an ophthalmic mounting, said supporting structure comprising a pair of lens rims, a bridge member connecting said lens rims, and temple connection means on the temporal sides of said rims, the upper portion of said rims and bridge member being formed to a given controlled contour shape, and each of said rims having an inner lens receiving groove extending throughout the sides and lower portions thereof, the upper portions of said rims having a longitudinal slot communicating with said grooves and of a length substantially equal to the major width of the lens to be positioned within the groove of the rim whereby the lenses to be supported by said mounting may be positioned within the grooves of the rims by insertion thereof through the slots, and bar-like means of a length sufficient to straddle the distance between the extremities of the respective slots and having a lower surface portion extending throughout the length thereof shaped substantially to the contour shape of said upper portions of the rims and to fit in intimate relation therewith when the lenses are properly positioned within the lens receiving grooves, and said bar-like means having portions on the under side thereof shaped to receive connection means for attaching and retaining the lenses in proper aligned relation on said means, whereby bar-like means and lenses having different characteristics may be formed as units for interchangeable use with said structure.

VIRGINIA B. ROYCE.

REFERENCES CITED

The following references are of record in the file of this patent:

UNITED STATES PATENTS

| Number | Name | Date |
| --- | --- | --- |
| 1,986,688 | Thiele | Jan. 1, 1935 |
| 2,284,630 | Banks | June 2, 1942 |
| 2,380,638 | D'Arbano | July 31, 1945 |
| 2,382,962 | Courtney | Aug. 21, 1945 |
| 2,479,754 | Marks | Aug. 23, 1949 |
| 2,482,144 | Allen | Sept. 20, 1949 |

FOREIGN PATENTS

| Number | Country | Date |
| --- | --- | --- |
| 61,369 | Norway | Sept. 4, 1939 |
| 608,735 | Great Britain | Sept. 20, 1948 |